United States Patent [19]

Zorzi

[11] 4,266,442
[45] May 12, 1981

[54] FLYWHEEL INCLUDING A CROSS-PLY COMPOSITE CORE AND A RELATIVELY THICK COMPOSITE RIM

[75] Inventor: Edward S. Zorzi, Ballston Lake, N.Y.

[73] Assignee: General Electric Company, Schenectady, N.Y.

[21] Appl. No.: 33,189

[22] Filed: Apr. 25, 1979

[51] Int. Cl.³ .................. G05G 1/00; G05G 3/00; F16F 15/30; F16C 15/00
[52] U.S. Cl. .................................... 74/572; 403/273
[58] Field of Search ............... 74/572, 573 R, 573 F, 74/574, 5; 310/74; 403/273

[56] References Cited

U.S. PATENT DOCUMENTS

| 3,602,066 | 8/1971 | Wetherbee, Jr. | 74/572 |
| 3,602,067 | 8/1971 | Wetherbee, Jr. | 74/572 |
| 3,788,162 | 1/1974 | Rabenhorst et al. | 74/572 |
| 3,859,868 | 1/1975 | Post | 74/572 |
| 3,884,093 | 5/1975 | Rabenhorst | 74/572 |
| 4,102,221 | 7/1978 | Hatch | 74/572 |
| 4,187,738 | 2/1980 | Knight, Jr. et al. | 74/572 |
| 4,198,878 | 4/1980 | Lewis et al. | 74/572 |
| 4,207,778 | 6/1980 | Hatch | 74/572 |

OTHER PUBLICATIONS

"Scotchply", Prepegs for Flywheel Applications, Snell et al., notes from presentation by Snell on 11/12/1975, pp. 203-209.

"Flywheels", Post et al., Scientific American, vol. 229, No. 6, 12/1973, pp. 17-23.
"A Status of the 'Alpha-Ply' Composite Flywheel Concept Development", proceeding from S.A.M.P.E., vol. 23, pp. 712-727, 5/2/1978.

Primary Examiner—C. J. Husar
Assistant Examiner—Moshe I. Cohen
Attorney, Agent, or Firm—Nathan D. Herkamp; James C. Davis, Jr.; Paul R. Webb, II

[57] ABSTRACT

A flywheel includes a cross-ply composite central portion including a plurality of fiber-containing layers and a relatively thick rim portion of circumferentially wound fibers impregnated with a binder. The relatively thick rim portion surrounds the central portion and is of sufficient radial thickness such that the ratio of the outer radius of the central portion to the outer radius of the rim portion is equal to or less than 0.90. The rim and central or core portions are secured together by a relatively large interference fit of at least 0.001 inch per inch of the outer radius of the rim. Such interference fit substantially precludes failure of the flywheel by rim-core separation as would occur in similar flywheels having such relatively thick rims in the absence of the aforesaid large interference fit. The tangential modulus of elasticity of the rim-portion fibers is substantially greater than the corresponding modulus of the core-portion fibers. The flywheel typically exhibits increased energy storage capacity with maximum utilization of the stress-strain properties of both the core fibers and the rim fibers.

14 Claims, 7 Drawing Figures

FLYWHEEL INCLUDING A CROSS-PLY COMPOSITE CORE AND A RELATIVELY THICK COMPOSITE RIM

This invention relates to a flywheel including a cross-ply composite core portion and a relatively thick composite rim portion secured to the core portion by an interference fit of sufficient magnitude to substantially preclude rim-core separation and to a flywheel-making method.

BACKGROUND OF THE INVENTION

Cross-ply composite flywheels are described in U.S. Pat. No. 3,788,162 (Rabenhorst et al.) and U.S. Pat No. 4,102,221 (Hatch). A flywheel including a cross-ply composite core and a composite rim is described by Hatch in co-pending U.S. Patent Application, Ser. No. 955,830, filed Oct. 30, 1978, now U.S. Pat. No. 4,207,778 and assigned to the assignee hereof. The present invention is neither disclosed nor suggested by the above-cited patents and Hatch application, which are incorporated herein by reference.

In greater detail, the Hatch application describes a preferred flywheel (referred to therein as a "circumferentially reinforced cross-ply composite flywheel" and referred to hereinafter as the "Hatch Flywheel"), which comprises a cross-ply composite center portion comprising a plurality of fiber-containing layers. The fibers of each layer are parallel to each other, extend in radial and chordal directions, and are each disposed in a matrix of binder material. The fibers of each successive layer are oriented at a single predetermined angle of between approximately 70° and approximately 110° to the fibers of the preceding adjacent layer such that at least four of the fiber-containing layers are disposed between any two layers in which the fibers of both such layers (i.e., the two last-mentioned layers) extend substantially parallel to each other. A means is included for radially outward transfer of centrifugal loading from the radially outermost chordal fibers of each layer of the central cross-ply composite portion. The load-transfer means is an outer rim portion contiguous with the cross-ply composite central portion and of an axial thickness at least as great as that of the central portion. The outer rim portion comprises a multiplicity of circumferentially-extending fibers disposed in a matrix of binder material. The density-to-stiffness ratio of the rim portion is substantially less in value than the density-to-stiffness ratio of the cross-ply composite central portion.

The Hatch application further discloses such a flywheel wherein the cross-ply composite central portion is in compression in a radial direction and the rim-portion fibers are in tension. Although that application does not contain an express written description of the numerical ratio of the radius of the central portion to the outer radius of the rim portion, such numerical ratio appears to be greater than 0.92 in FIGS. 2-3 thereof.

In an article by E. L. Lustenader and E. S. Zorzi titled "A Status of the 'Alpha-Ply' Composite Flywheel Concept Development," proceedings of the Society for the Advancement of Material and Process Engineering, Volume 23, Pages 712-727 (1978), there is described a rim-core composite flywheel wherein the core is an E-glass disk having an outside diameter of 29 inches and a circumferential wrap of Kevlar tape. Since the overall diameter of that flywheel is 30 inches, the radii ratio is about 0.9667.

DESCRIPTION OF THE INVENTION

Generally stated, in one aspect, the present invention provides an improved flywheel, which comprises an improvement of the above-described Hatch Flywheel. In the improvement, generally stated, the rim portion is relatively thick in the radial direction. That is, the rim portion is of sufficient radial thickness such that the ratio ($\beta$) of the outer radius of the central portion to the outer radius of the rim is equal to or less than 0.92, and preferably $\leq 0.90$. The rim and central or core portions are secured together by a large interference fit of at least 0.001 inch per inch of the outer radius of the rim. That is, these portions are in interfacial engagement with an interface pressure of sufficient magnitude such that, during rotation of the flywheel at increasingly high speeds, failure of the flywheel by rim-core separation is substantially precluded. Such separation would occur in similar flywheels having such relatively thick rims in the absence of the aforesaid large interference fit. The flywheel of this invention typically exhibits increased maximum allowable speed of rotation and accordingly maximum energy storage capacity with maximum utilization of the stress-strain properties and/or strength of both the core fibers and the rim fibers.

In another aspect, this invention provides a method which may be employed for making the flywheel hereof. Generally stated, the method comprises the steps of:

(A) providing a cross-ply composite flywheel disc comprising a plurality of fiber-containing layers, the fibers of each layer being parallel to each other and extending in radial and chordal directions and being disposed in a first matrix of binder material, (B) providing a ring comprising a multiplicity of circumferentially extending fibers disposed in a second matrix of binder material in parallel relation each to the others, the inner periphery of the ring being of a shorter lateral extent than the outer periphery of the flywheel, (C) radially shrinking the flywheel disk until the outer periphery thereof is less in lateral extent than the lateral extent of the inner periphery, (D) registering the shrunken disc with the ring such that subsequent radial expansion of the disc will effect a condition of interfacial contact of the outer periphery thereof with the inner periphery of the ring, (E) radially expanding the shrunken disc to an extent such that the condition of interfacial contact obtains, and (F) continuing the expanding step to expand the disc to an extent such that the disc and the ring are secured together by an interference fit of at least 0.001 inch per inch of radius from the geometric center of the disc to the outer periphery of the ring as measured at the termination of the continued-expanding step and with the resulting flywheel at rest, the outer radius of the disc and the outer radius of the ring being such that the ratio of the two lastmentioned radii is less than 0.90:1 in the order given. In the method, the fibers of each successive layer are preferably oriented at a single predetermined angle of between approximately 70° and approximately 110° as described above.

BRIEF DESCRIPTION OF THE DRAWING

This invention will be more fully understood from the following detailed description taken with the accompanying drawing, which illustrates the best mode contemplated for carrying out the invention.

In the drawing, wherein like numerals refer to similar elements throughout.

DETAILED DESCRIPTION OF THE INVENTION AND MANNER AND PROCESS OF MAKING AND USING IT

Figures 1, 2:
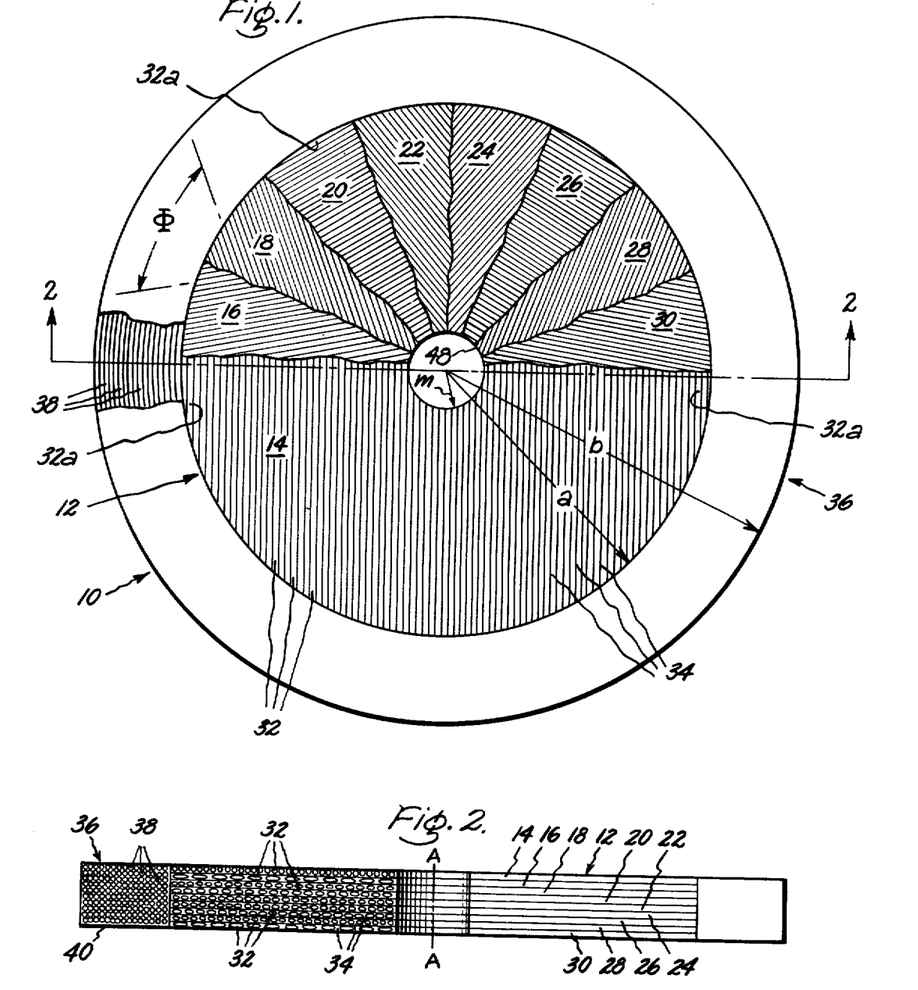
FIG. 1 is a fragmentary plan view of a flywheel in accordance with a preferred embodiment of this invention.
FIG. 2 is a sectional view taken on line 2—2 of FIG. 1.

Referring to FIG. 1 and FIG. 2, there is shown flywheel 10 comprising central portion 12 formed of a plurality of fiber-containing layers 14, 16, 18, 20, 22, 24, 26, 28 and 30. Each of these layers contains a multiplicity of generally equally-spaced fibers 32, which are parallel to each other and extend in radial and chordal directions. The fibers, which may be, for example, glass fibers (e.g., E-glass, S-glass) or the like, are disposed in a matrix 34 of a suitable binder, which may be, for example, epoxy resin or the like. The fibers of each successive layer are preferably oriented at a single predetermined angle $\Phi$ of preferably between approximately 70° and 110° to those of the preceding adjacent layer such that at least four of the fiber-containing layers are disposed between any two layers in which the fibers of both such layers (i.e., the two last-mentioned layers) extend substantially parallel to each other (i.e., such two layers are co-oriented). As will be apparent to those skilled in the art, 90° is excluded from the above-described preferred range of angles. As used herein the term "single predetermined angle" means that the angle is constant throughout the thickness of the flywheel. This angle is preferably approximately 80° as illustrated in FIG. 1 and corresponds to an arrangement wherein eight intermediate layers (e.g., layers 16 through 30) are disposed between two co-oriented layers (e.g., layer 14 and optionally additional layer 14, not shown). The binder, which is cured after layers or laminations 14 through 30 are laid up, forms a monolithic matrix throughout the flywheel. This preferred cross-ply composite structure is disclosed and claimed in the aforementioned Hatch patent, incorporated herein by reference.

Although this cross-ply structure, per se, overcomes many of the deficiencies of prior art composite flywheels wherein all the fibers making up the flywheel are wound in a circumferential direction, it has been found that the energy storage capabilities of the cross-ply flywheel in turn may be improved upon in certain respects. As shown in FIG. 1, each layer includes fibers 32a (three shown) which are disposed at radially outer locations of the flywheel. At these radially outer portions such fibers extend in chordal directions, substantially perpendicular to flywheel radii. During operation (i.e., flywheel rotation), fibers 32a are loaded by centrifugal force in directions perpendicular to the axes thereof. Since fibers 32 (including fibers 32a) are strongest in the direction of their axes, those radially outer portions of the composite layers containing chordally directed fibers 32a are loaded in a direction in which such portions are relatively weak and are, therefore, more susceptible to radial displacement, rupture, or both. Such susceptibility is greater for axially outermost layers (e.g., layer 14) relative to the susceptibility for interior layers (e.g., layer 20). The speed of rotation, and hence the energy storage capability, of a flywheel constructed totally in a cross-ply arrangement may be limited by risk of rupture of fibers in locations exemplified by the location of fibers 32a or by risk of delamination of the flywheel at such locations.

By the Hatch Flywheel invention, the strength of the above-described cross-ply flywheel is increased, increasing the energy storage capability of the flywheel. This strengthening is accomplished by adding to the cross-ply construction a relatively high strength lightweight rim portion 36 formed of a multiplicity of generally parallel circumferentially extending fibers 38, located at generally equal spacings and disposed within a matrix 40 of any suitable binder, which may be of epoxy resin or the like. Fibers 38 are of a substantially lower (e.g., 30 to 60% lower) density-to-stiffness ratio than fibers 32 disposed in the central portion or core 12 of the flywheel. Preferably, fibers 38 have a density-to-stiffness ratio approximately 40% lower than that of fibers 32. It has been found that polyamide polymeric fibers produced by E. L. DuPont de Nemours and Company and sold under the trademark Kevlar are particularly well suited for use as rim, or reinforcement, fibers. Such fibers typically have a density-to-stiffness ratio (density/stiffness modulus) of $3 \times 10^{-9}$ in.$^{-1}$ and a longitudinal tensile strength of between 400,000 and 500,000 pounds per square inch. This high strength and relatively low density allow the Kevlar fiber to effectively accommodate transfer of centrifugal loading from the core-portion fibers to the rim while minimizing the risk of rupture of the rim fibers.

A high-strength low-density rim may be achieved by the utilization of a high-strength, light-weight binder or a combination of a high-strength light-weight binder with high-strength light-weight fibers such as the aforementioned Kevlar fibers.

In a first preferred embodiment the rim-portion fibers 38 are Kevlar-49 polyamide fibers and the core-portion fibers 32 are glass fibers having a density-to-stiffness ratio of about $5 \times 10^{-9}$ inch$^{-1}$. The glass fibers may be S-glass or E-glass fibers, with S-glass fibers being preferred.

In accordance with this invention the rim portion is relatively thick in the radial direction. That is, the rim portion is of sufficient radial thickness such that the ratio $\beta$ of the radius a of the central portion to the outer radius b of the rim is equal to or less than 0.90. The ratio $\beta$ may be, for example, from about 0.6 or less to about 0.9, preferably about 0.6 to about 0.8. The rim and core are secured together by a relatively large interference fit $\bar{\delta}$ of at least 0.001 inch per inch of the outer radius b of the rim as measured with the flywheel at rest. That is, these portions are in interfacial engagement with a rim-core interface pressure $P_i$ (measured while the flywheel is at rest) of sufficient magnitude such that, during rotation of the flywheel at increasingly high speeds, failure of the flywheel by rim-core separation is substantially precluded. Such separation occurs in similar flywheels having such relatively thick rims in the absence of the aforesaid large interference fit. The improved flywheel of this invention typically exhibits increased maximum allowable speed of rotation, and accordingly maximum energy storage capacity, with maximum utilization of the stress-strain properties and/or strength of both the core fibers and the rim fibers.

The interference fit $\bar{\delta}$ is the ratio $\delta/b$ where b is the outer radius and $\delta = u_C + u_R$. The displacement term $u_C$ is the circumferentially average radial distance which the core moves outwardly in expansion when the rim is removed therefrom with the flywheel at rest and the core is at a temperature of 70° F. The displacement term $u_R$ is the circumferentially average radial distance which the inner circumference of the rim portion moves inwardly in contraction when the core is removed therefrom with the flywheel at rest and the rim is at 70° F. At least one of $u_C$ and $u_R$ is other than zero. The terms $\delta$, b, $u_C$ and $u_R$ are expressed in like units, e.g. inches.

As shown below, the rim-core interface pressure is a function of terms comprising the interference fit $\bar{\delta}$.

Figure 7:
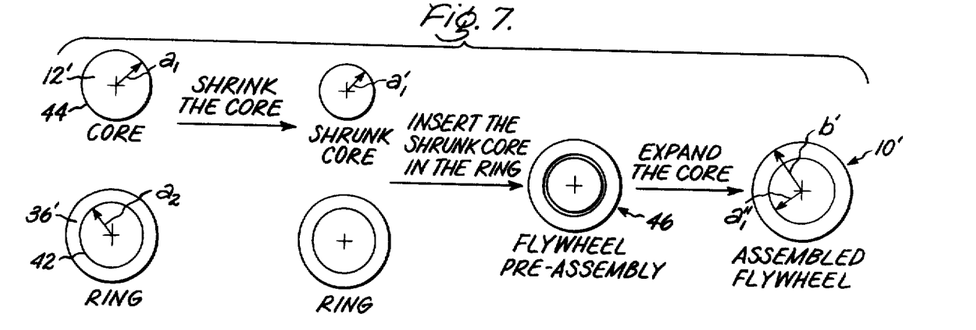
FIG. 7 schematically illustrates the interference fit and a preferred process for making the flywheel.

The interference fit (and its magnitude) may be further understood by reference to FIG. 7, which schematically illustrates the flywheel-making process of this invention, which, conveniently, does not require curing of a binder to effect securing of the core to the surrounding rim. As shown therein, there are provided cross-ply composite flywheel disc or core 12' and ring 36', which may be substantially identical to core 12 and rim 36, respectively, except that at a given ambient temperature (e.g. 70° F.) the inner periphery 42 of the ring is of shorter lateral extent than the outer periphery 44 of the core. Correspondingly, the outer radius $a_1$ of the core is greater than the inner radius $a_2$ of the ring at such temperature.

Next, the core is radially shrunk, as by cooling to a suitably low temperature (e.g. 4° K.), until the outer periphery 44 is less in lateral extent than that of inner periphery 42 of the ring and of lesser radius $a_1'$ than radius $a_2$. Thereafter, the shrunken disc or core and the ring are brought into register, as by inserting the shrunken core in the cavity of the ring, such that subsequent radial expansion of the disc will effect a condition of interfacial contact of the outer periphery thereof with the inner periphery of the ring. Such register is illustrated by the flywheel pre-assembly 46 in FIG. 7.

The shrunken disc is thereafter radially expanded, as by heating, to an extent such that the condition of interfacial contact is obtained. The expanding step is continued to expand the disc to an extent such that the disc and ring are secured together by an interference fit of at least 0.001 inch per inch of radius b' as measured at the termination of the ocntinued expanding step, thereby forming assembled flywheel 10'. Therein, the circumferentially parallel rim-core interface is at radius $a_1''$, which is less than $a_1$ and more than $a_2$. The interference $\bar{\delta}'$ can be approximated as the sum of a first term and a second term, which are respectively $(a_1 - a_1'')$ and $(a_1' - a_2)$. The interference fit $\bar{\delta}'$ is the quotient $\delta'/b'$ for flywheel 10'.

For better results, the tangential modulus ratio $(E_\theta)_R:(E_{74})_C$ is at least 3:1, where $(E_\theta)_R$ is the average tangential modulus of elasticilty of the rim portion fibers, $(E_\theta)_C$ is the average tangential modulus of elasticity of the central portion fibers, and $(E_\theta)_R$ and $(E_\theta)_C$ are expressed in like units and the interference fit $\bar{\delta}$ is from 0.001 to the lesser of about 0.004 and that value of $\bar{\delta}$ at which the pressure $P_i$ at the rim-core interface is the lesser of $P_I$ and $P_{II}$ where $P_I$ and $P_{II}$ are the static rupture pressures of the core and rim, respectively.

In addition to the above-described at least 3:1 tangential modulus ratio (TMR), the core portion fibers preferably have the following properties: $(E_\theta)_C$ and $(E_r)_C$ of from about $1 \times 10^6$ to about $10 \times 10^6$ psi, $(S_\theta)_C$ of at least $50 \times 10^3$ psi and $(S_r)_C$ of at least $50 \times 10^3$ psi; and the rim portion fibers preferably have the following properties: $(E_\theta)_R$ of from about $6 \times 10^6$ to about $30 \times 10^6$ psi, $(E_r)_R$ of from about $1 \times 10^5$ to about $3 \times 10^7$ psi, $(S_\theta)_R$ of at least $100 \times 10^3$ and $(S_r)_R$ of at least $5 \times 10^2$ psi. In the immediately preceding description the subscripts C and R refer to the central portion fibers and rim portion fibers, respectively, and $E_\theta$ and $E_r$ are the moduli of elasticity in the tangential and radial directions, respectively, and $S_\theta$ and $S_r$ are the breaking strengths in the tangential and radial directions, respectively.

The foregoing fiber properties are given here and throughout this description and in the claims which follow for cured pre-preg fibers, i.e., a binder-fiber composite after curing of the binder.

For flywheels comprising fibers having the foregoing properties, the rim-portion fibers may be, for example, selected from the group consisting of graphite fibers, Kevlar polyamide fibers, and boron fibers, and the central portion fibers may be, for example, selected from the group consisting of E-glass fibers and S-glass fibers.

The flywheel of this invention is preferably constructed such that, as the rotational speed $\omega b$ thereof (where $\omega$ is such speed in radians per second) is increased from $\omega b = 0$, the rim portion can be stressed to the breaking strength thereof in the radial direction prior to separation of the rim portion from the core. To obtain such result, it is preferred that the ratio of $(E_\theta)_R:(E_\theta)_C$ and the interference fit $\bar{\delta}$ are each sufficiently large such that the rim-core separation speed $(\omega b)_{SS}$ is greater than the rim-radial breaking speed $(\omega b)_{rR}$ for all values of $\beta$ equal to or less than 0.92. In general, the above-described at least 3:1 TMR satisfies the first condition.

Figure 3:
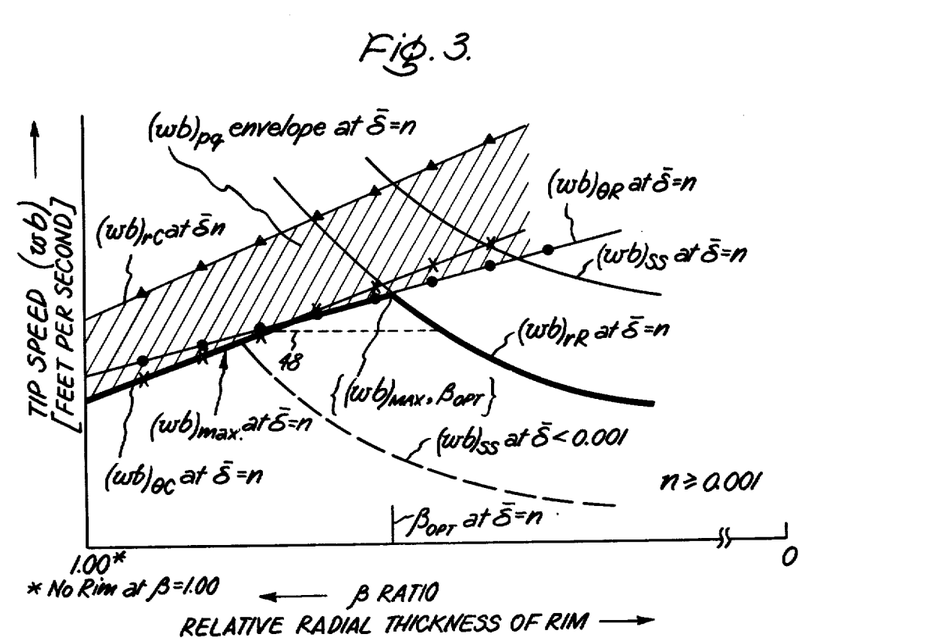
FIG. 3 is a schematic multi-curve graph illustrating various limiting rotational speeds of the flywheel as a function of the radii ratio $\beta$ at a specified interference fit, the various limiting speeds corresponding to limiting stresses in the various fibers and rim-core separation.

FIG. 3 illustrates the foregoing relationship of $(\omega b)_{SS} > (\omega b)_{rR}$ by the corresponding illustrative curves for such speeds at $\bar{\delta} = n$, where n is a number equal to or greater than 0.001 and satisfying the second condition. The rim-core separation speed $(\omega b)_{SS}$ is the tangential velocity or "tip speed" of the flywheel at the outer radius b of the rim at which the flywheel fails by rim-core separation and is dependent, in part, on $\beta$ and $\bar{\delta}$. For a given $\bar{\delta}$, the term $(\omega b)_{SS}$ increases with increasing $\beta$. The rim-radial breaking speed $(\omega b)_{rR}$ is the tangential velocity or "tip speed" of the flywheel at the outer radius b of the rim at which the flywheel fails by rupture of the rim-portion fibers in the radial direction of the flywheel, such rupture being transversely of the longitudinal axis of the rim-portion fibers and is dependent, in part, on $\beta$ and $\bar{\delta}$. For a given $\bar{\delta}$, the term $(\omega b)_{rR}$ increases with increasing $\beta$.

The flywheel of this invention is preferably of uniform axial thickness throughout. The balance of this description is given with principal reference to such uniform-thickness flywheel.

The rim-core separation speed may be determined approximately from a first equation defining $(\omega b)_{SS}$ as a function of terms comprising $\beta$ and $\delta$ where $\beta$ and $\delta$ are as defined above, the first equation being:

$$(\omega b)_{SS} = \left[ \frac{\delta}{\frac{\rho_R A_1}{(Q_r)_R (9-k^2)} - \frac{\rho_C \beta^3 A_2}{8(Q_r)_C}} \right]^{\frac{1}{2}} \quad \text{(Eq. 1)}$$

where:

$$A_1 = \beta^3 + \frac{3 + \alpha_R}{k + \alpha_R}\left(\frac{1 - \beta^{k-3}}{1 - \beta^{2k}}\right)\beta^k + \frac{3 + \alpha_R}{k - \alpha_R}\left(\frac{\beta^{2k} - \beta^{k+3}}{1 - \beta^{2k}}\right)\beta^{-k} \quad \text{(Eq. 1a)}$$

$$A_2 = -1 + \frac{3 + \alpha_C}{k + \alpha_C} \quad \text{(Eq. 1b)}$$

The remaining terms are defined below.

The rim-radial breaking speed may be determined approximately from a second equation defining $(\omega b)_{rR}$ as a function of terms comprising $\beta$, $\delta$ and $(\sigma_r)_R$, the second equation being:

$$(\omega b)_{rR} = \left[ \frac{(\sigma_r)_R - (R^{k-1} - R^{-k-1})P\beta^{k+1}}{\left[\frac{\rho_R(3+\alpha_R)}{(9-k^2)(1-\beta^{2k})}\right][(R^{-k-1} - R^2)]} \right]^{\frac{1}{2}} \quad \text{(Eq. 2)}$$

where $P_i$ is the rim-core interface contact pressure, which may be determined approximately from Eq. 2a below:

$$P_i = \frac{\delta(Q_\theta)_R}{\beta k \left[\frac{(Q_r)_R/(Q_r)_R}{1 - \beta_o^{2k_o}}\right]\left[\frac{1}{k_o + \alpha_C} + \frac{\beta_o^{2k_o}}{k_o - \alpha_C}\right] + A_3} \quad \text{(Eq. 2a)}$$

where:

$$A_3 = \left[\frac{1}{\beta(1 - \beta^{2k})}\right]\left[\frac{\beta^{2k+1}}{k + \alpha} + \frac{\beta}{k - \alpha}\right] \quad \text{(Eq. 2b)}$$

In the above equations:

$\delta = \delta/b$, where $\delta$ and b are in like units, b = the outer radius of the rim portion in inches when the flywheel is at rest, $\omega$ = the rotational speed of the flywheel in radians per second, $\delta = \mu_C + \mu_R$ where $\mu_C$ is the radial distance the central portion moves in expansion in inches when the rim is removed therefrom with the flywheel at rest and said portion is at a temperature of 70° F., and $\mu_R$ is the radial distance the rim portion moves in contraction in inches when the central portion is removed therefrom with the flywheel at rest and said rim portion is at said temperature, $(\sigma_r)_R$ = the ultimate tensile strength of the composite rim portion in the radial direction in psi, $\beta$ is a dimensionless number as defined above, $\beta_o = m/a$ where m and a are expressed in like units and are the inner radius and outer radius, respectively, of the central portion (and m can be zero), R = r/b, where r is the radial distance in inches from the geometric axis of the flywheel to any given point therein and b is defined above, $\rho_R$ = the density in pounds per cubic inch of the rim portion, $\rho_C$ = the density in pounds per cubic inch of the central portion, $\alpha_R = (v_{r\theta})_R$ where $(v_{r\theta})_R$ is Poisson's ratio for the composite rim portion and equals the quotient of the radial tensile strain therein divided by the resulting tangential compressive strain therein, $\alpha_C = (v_{r\theta})_C$ where $(v_{r\theta})_C$ is Poisson's ratio for the composite central portion and equals the quotient of the radial tensile strain therein divided by the resulting tangential compressive strain therein, $k = [(E_\theta)_R/(E_r)_R]^{\frac{1}{2}}$, where $(E_\theta)_R$ is the average modulus of elasticity of the composite material of the rim portion in the tangential direction and $(E_r)_R$ is the average modulus of elasticity thereof in the radial direction, and each E is in psi, $k_o = [(E_\theta)_C/(E_r)_C]^{\frac{1}{2}}$, where $(E_\theta)_C$ is the average modulus of elasticity of the composite material of the core portion in the tangential direction and $(E_r)_C$ is the average modulus of elasticity thereof in the radial direction, and each E is in psi, $$(Q_r)_R = \left[\frac{(E_r)_R}{1 - (v_{r\theta})_R (v_{\theta r})_R}\right].$$

where $(E_r)_R$ and $(v_{r\theta})_R$ are as defined above and $(v_{\theta r})_R$ is Poisson's ratio for the composite material of the rim portion and equals the quotient of the tangential tensile strain therein divided by the resulting radial compressive strain, $$(Q_\theta)_R = \left[\frac{(E_\theta)_R}{1 - (v_{r\theta})_R (v_{\theta r})_R}\right].$$

where $(v_{R\theta})_R$, $(v_{\theta r})_R$ and $(E_\theta)_R$ are as defined above.

Also plotted in FIG. 3 is a separation speed curve shown by dashed lines for $(\omega b)_{SS}$ at $\delta < 0.001$, where the symbol < means "less than". In general, at $\delta < 0.001$, rim-core separation occurs prior to development of radial stress in the rim to an extent exceeding the breaking strength thereof in the radial direction.

FIG. 3 also shows a family of rupture-limiting speed curves, referred to herein as $(\omega b)_{pq}$ curves where the subscript p is $\theta$ (i.e. the tangential direction) or r (i.e. the radial direction) and the subscript q is C (i.e. the core) or R (i.e. the rim). The $(\omega b)_{pq}$ curves, which may be rectilinear, curvilinear or a combination thereof, define, for $\delta = n \geq 0.001$, an $(\omega b)_{pq}$ envelope which is schematically represented as a shaded region in FIG. 3. The $(\omega b)_{pq}$ curves increase with decreasing $\beta$ (and accordingly with increasing relative radial thickness of the rim), at constant $\delta = n \geq 0.001$, and include curves generally illustrating: (1) the rim-tangential breaking speed $(\omega b)_{rR}$, (2) the core-radial breaking speed $(\omega b)_{rC}$, and (3) the core-tangential breaking speed $(\omega b)_{\theta C}$, where:

$(\omega b)_{rC}$ is the tangential velocity of the flywheel at the outer radius of the rim at which the flywheel fails by rupture of the core-portion fibers in the radial direction of the flywheel, $(\omega b)_{\theta C}$ is the tangential velocity of the flywheel at the outer radius of the rim at which the flywheel fails by rupture of the core-portion fibers in the tangential direction of the flywheel, and $(\omega b)_{\theta R}$ is the tangential velocity of the flywheel at the outer radius of the rim at which the flywheel fails by rupture of the rim-portion fibers in the tangential direction of the flywheel.

Also as illustrated in FIG. 3, the $(\omega b)_{pq}$ envelope has a lower boundary line defining a portion of a limiting speed curve $(\omega b)_{max}$ (shown by a heavy line) where $(\omega b)_{max}$ in such portion is the maximum tip speed (for any given set of values of rim-radius b and $\beta$—as a function of $\beta$ at constant $\bar{\delta}$) obtainable without appreciable failure of the flywheel by any of the following failure modes:

(1) rupture of the core-portion fibers in the radial direction, (2) such rupture in the tangential direction, and (3) rupture of the rim-portion fibers in the tangential direction.

As shown in FIG. 3, the lower boundary of the $(\omega b)_{pq}$ envelope is made up of the loci of the minimum values of $\omega b$ selected from the group consisting of $(\omega b)_{rC}$, $(\omega b)_{\theta C}$, and $(\omega b)_{\theta R}$ for each value of $\beta$.

The curve $(\omega b)_{max}$ has a maximum value $(\omega b)_{MAX}$, at the peak of the curve, i.e. where the rim-radial breaking speed $(\omega b)_{rR}$ is equal to the minimum value of $\omega b_{pq}$. Such peak is graphically shown by the point of intersection of the lower boundary of the $(\omega b)_{pq}$ and the curve $(\omega b)_{rR}$ at $\bar{\delta}=n$. This peak occurs at a value of $\beta$ identified herein as $\beta_{OPT}$, i.e. the optimum value of $\beta$ at $\bar{\delta}=n$. Accordingly, the peak is identified in FIG. 3 as having ordinates of $\omega b=(\omega b)_{MAX}$ and $\beta=\beta_{OPT}$. The portion of the $(\omega b)_{max}$ curve for $\beta<\beta_{OPT}$ is the portion of the $(\omega b)_{rR}$ curve (at $\bar{\delta}=n$) throughout which $(\omega b)_{rR}$ is less than the minimum value of $(\omega b)_{pq}$, while the portion of the $(\omega b)_{max}$ curve for $\beta>\beta_{OPT}$ is the portion of the lower boundary of the $(\omega b)_{pq}$ envelope throughout which $(\omega b)_{rR}$ is more than the minimum value of $(\omega b)_{pq}$. As described in greater detail below, e.g. in the description given with principal reference to FIG. 5, $\beta_{OPT}$ depends on $\bar{\delta}$, generally increasing with increasing $\bar{\delta}$.

For a given $\bar{\delta}$, the flywheel can have any suitable value of $\beta$. Advantageously, the flywheel includes a rim portion having sufficient relative radial thickness such that, for a given $\bar{\delta}$, the $\beta$ ratio of the flywheel is in the range of values of $\beta$ throughout which the flywheel can be rotated at a speed of at least 0.9 times $\omega$-max without exceeding any of the breaking strengths in the group consisting of $(\sigma_\theta)_C$, $(\sigma_\sigma)_R$, $(\sigma_r)_C$ and $(\sigma_r)_R$, this range including the optimum $\beta$ for the given $\bar{\delta}$. As used herein, including the claims which follow, the term "$\omega$-max" means the rotational speed, in radians per second, corresponding to $(\omega b)_{MAX}$ at any given $\bar{\delta}$. Such range of $\beta$ values is schematically illustrated in FIG. 3 by horizontal broken line 48. In the last-mentioned group, the various "$\sigma$" terms are as defined elsewhere herein. The best $\beta$ contemplated for a given $\bar{\delta}$ is $\beta_{OPT}$. In general, $\beta_{OPT}$ may be in the range from about 0.6 to 0.9.

As a general preference, the interference fit $\bar{\delta}$ is at least 0.75 times $\bar{\delta}$-max, where $\bar{\delta}$-max is that value of $\bar{\delta}$ at which the pressure at the rim-core interface is the lesser of $P_I$ and $P_{II}$ where $P_I$ and $P_{II}$ are the static rupture pressures of the core and rim, respectively.

In an embodiment the core portion fibers are principally E-glass fibers and the rim-portion fibers are principally Kevlar polyamide fibers, and $\bar{\delta}$ is from about 0.002 to about 0.004. In another embodiment the core portion fibers are principally S-glass fibers and the rim-portion fibers are principally Kevlar polyamide fibers, and $\bar{\delta}$ is from about 0.002 to about 0.004. In another embodiment the core-portion fibers are principally S-glass fibers and the rim-portion fibers are principally graphite fibers, and $\bar{\delta}$ is from about 0.002 to about 0.004.

In general, the modulus of elasticity of the rim-portion fibers radially of the flywheel is substantially less than the modulus of elasticity of the core-portion fibers radially of the flywheel.

The rim-tangential breaking speed $(\omega b)_{\theta R}$ may be determined approximately from a third equation defining $(\omega b)_{\theta R}$ as a function of terms comprising $\beta$, $\bar{\delta}$ and $(\sigma_\theta)_R$, said third equation being:

$$(\omega b)_{\theta R} = \left[ \frac{(\sigma_\theta)_R - (R^{k+1} - R^{-k-1}) k P \beta^{k+1}}{\left[ \frac{\rho R(3+\alpha)}{(9-k^2)(1-\beta^{2k})} \right] [Z]} \right]^{\frac{1}{2}} \quad (Eq. 3)$$

where:

$$Z = [k(1-\beta^{k+3})R^{k-1}] + [k(\beta^{2k} - \beta^{k+3})R^{-k-1}] - \left[ \frac{(k^2 + 3\alpha_R)(1-\beta^{2k})R^2}{3+\alpha_R} \right] \quad (Eq. 3a)$$

where $(\sigma_\theta)_R$ is ultimate tensile strength of the composite rim portion in the tangential direction of the flywheel and the remaining terms are as defined above.

The core-radial breaking speed $(\omega b)_{rC}$ may be determined approximately from a fourth equation defining $(\omega b)_{rC}$ as a function of terms comprising $\beta, \bar{\delta}$ and $(\sigma_r)_C$, said fourth equation being:

$$(\omega b)_{rC} = \left[ \frac{(\sigma_r)_C + P}{\frac{\rho_C(3+\alpha_C)(\beta^2 - R^2)}{8}} \right]^{\frac{1}{2}} \quad (Eq. 4)$$

where $(\sigma_r)_C$ is the ultimate tensile strength of the composite core portion in the radial direction of the flywheel, $\rho_C$ is the density of said core portion, and the remaining terms are as defined above.

The core-tangential breaking speed $(\omega b)_{\theta C}$ may be determined approximately from a fifth equation defining $(\omega b)_{\theta C}$ as a function of terms comprising $\beta$, $\bar{\delta}$ and $(\sigma_\theta)_C$, said fifth equation being:

$$(\omega b)_{\theta C} = \left[ \frac{(\sigma_\theta)_C + P}{\left( \frac{\rho_C(3+\alpha_C)}{8} \right)(\beta^2 - R^2)\left( \frac{1-3\alpha_C}{3-\alpha_C} \right)} \right] \quad (Eq. 5)$$

where $(\sigma_\theta)_C$ is the ultimate tensile strength of the composite core in the tangential direction of the flywheel and the remaining terms are as defined above.

Although not shown in FIG. 3, the $(\omega b)_{rR}$ curve at $\bar{\delta}<0.001$ defines a tip speed $\omega b$ which, throughout the range of $\beta$ from 0 to 1.00, is greater than $(\omega b)_{SS}$ at $\delta < 0.001$ for each value of $\beta$.

As shown in FIGS. 1-2, the flywheel 10 may include hole 48 through the geometric axis thereof for mounting the flywheel on a shaft. Other suitable mounting means may be employed in combination with, or in lieu of, a mounting hole. For example, a pair of shaft-hub assemblies may be bonded to opposite faces of the core, as described in Rabenhorst et al.-U.S. Pat. No. 3,788,162. Hole 48 may have any suitable value for its radius m, e.g. up to about 0.90 times rim radius b, preferably 0.01 × b or less.

The ratio of the radial thickness t of the rim to the outer rim radius b is given by the term $(1-\beta)$.

Figure 4:
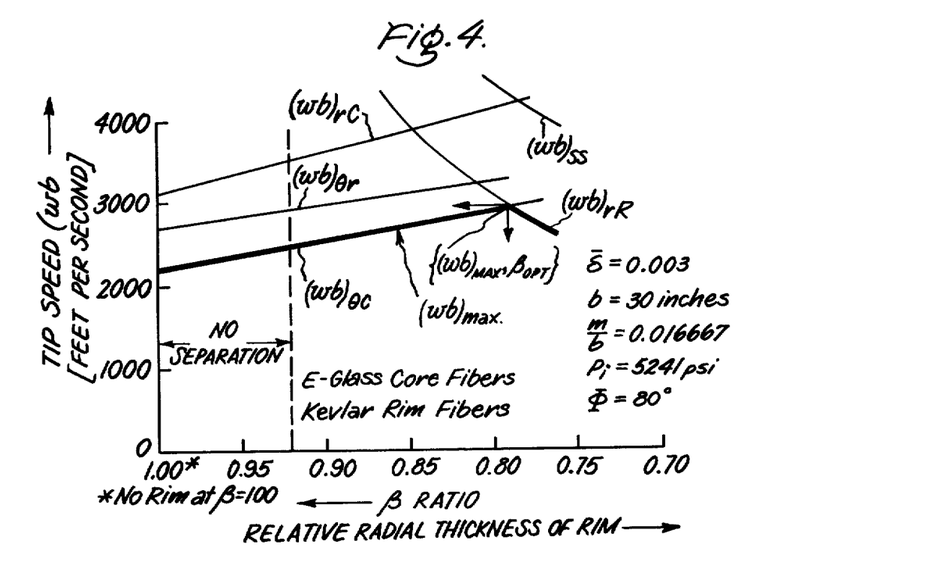
FIG. 4 is a multi-curve graph, similar to FIG. 3, for an embodiment of the flywheel wherein the core fibers are E-glass fibers and the rim fibers are polyamide fibers having high longitudinal strength and modulus.

FIG. 4 illustrates curves, similar to those in FIG. 3, for an embodiment of the flywheel wherein, in addition to the conditions set forth above under "BRIEF DESCRIPTION OF THE DRAWING", various parameters, dimensions, and the like are as set forth in FIG. 4. The various curves are plots of tip-speed data obtained from Equations 1-5 above, using the applicable approximate properties of the rims and cores prepared using curable epoxy binder and the indicated core-portion fibers and rim-portion fibers as set forth in Table I below.

TABLE I

| | APPROXIMATE PROPERTIES | | | |
|---|---|---|---|---|
| | FIBERS | | | |
| | CORE | | RIM | |
| Property | E-glass | S-glass | Kevlar 49* | Graphite** |
| Density-$\rho$ (lbs./cu.in) | 0.066 | 0.066 | 0.05 | 0.056 |
| Tangential Modulus ($E_\theta \times 10^{-6}$)psi | 2.6 | 2.8 | 12.8 | 20.6 |
| Radial Modulus ($E_r \times 10^{-6}$)psi | 2.6 | 2.8 | 0.8 | 1.30 |
| Tangential Strength ($S_\theta \times 10^{-2}$)psi | 101*** | 111*** | 190 | 250 |
| Radial Strength ($S_r \times 10^{-2}$)psi | 101*** | 111*** | 1.8 | 9.4 |
| Contact Rupture Strength × $10^{-2}$ psi | 50 | 55 | 7.4 | >7.4 |
| Thermal Coefficient of Expansion (× $10^6$/°F.) | 8.4 | 8.4 | — | — |

*Polyamide fiber by E. I. duPont de Nemours & Co.
**Graphite As-1904
***Substantially isotropic from macroscopic standpoint Since the $(\omega b)_{\theta C}$ curve does not intersect the $(\omega b)_{r\theta}$ curve for $\beta > \beta_{OPT}$ in FIG. 4, the former defines the entire portion of the $(\omega b)_{max}$ curve at $\beta > \beta_{OPT}$ in this embodiment. (However, in other embodiments, the $(\omega b)'_{max}$-defining portion of the $(\omega b)_{pq}$ envelope may be a combination of two or more $(\omega b)_{pq}$ curves as indicated in FIG. 3). In this preferred embodiment, at least nine core layers of laminations are employed, each layer preferably being about 0.01 inch in axial thickness, i.e. taken axially of the flywheel, conditions which are general preferences for other embodiments described herein. The value of $\beta_{OPT}$ at the preferred $\delta = 0.003$ is about 0.79, with $(\omega b)_{MAX}$ being about 2970 feet/second. It will be noted that, at $\delta = 0.003$, no rim-core separation will occur for $\beta$ values of 0.92 or more for the E-glass core fiber/Kevlar polyamide fiber rim flywheel.

Figure 5:
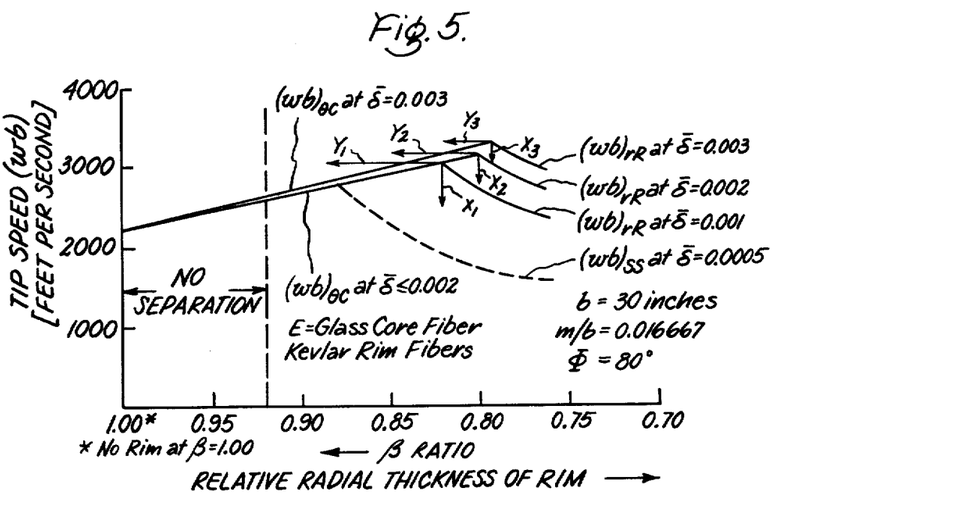
FIG. 5 is a multi-curve graph, similar to FIG. 4, showing effects of varying the magnitude of the interference fit.

FIG. 5 illustrates the effect of different $\delta$ values on the last-mentioned flywheel. Such effects include (1) a slight difference in the slope of the $(\omega b)_{\theta C}$ curves, especially as $\delta$ is varied between 0.002 and 0.003; (2) differences in the height of the $(\omega b)_{rR}$ curves for each $\beta$ value at different $\delta$ values; and (3) resulting differences in both $(\omega b)_{MAX}$ and the associated $\beta_{OPT}$ values. The approximate values of the two last-mentioned terms are tabulated below for the indicated $\delta$ values, along with approximate minimum and maximum $\beta$-values corresponding to at least 0.9 times $(\omega b)_{MAX}$:

| $\delta$ | $\beta_{OPT}$ | $(\omega b)_{MAX}$ | $\beta_{MIN}$-$\beta_{MAX}$ | 0.9 × $(\omega b)_{MAX}$ |
|---|---|---|---|---|
| 0.001 | 0.82 | 2725 | 0.80–0.88 | 2452 |
| 0.002 | 0.80 | 2800 | 0.78–0.88 | 2520 |
| 0.003 | 0.79 | 2925 | 0.76–0.87 | 2632 |

The various pairs of arrows $x_1$-$y_1$, $x_2$-$y_2$, and $x_3$-$y_3$ point to pairs of $(\omega b)_{MAX}$-$\beta_{OPT}$ in FIG. 5.

Figure 6:
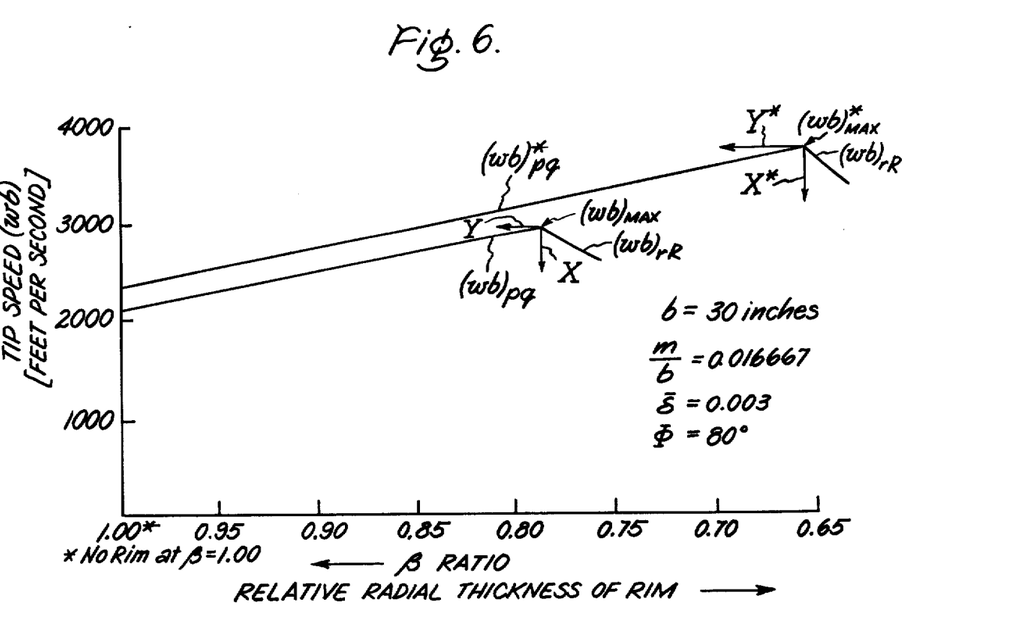
FIG. 6 is a multi-curve graph, similar to FIG. 3, for embodiments of the flywheel wherein the core fibers are of S-glass and the rim fibers are high-strength, high-modulus polyamide or graphite fibers.

FIG. 6 illustrates minimum $(\omega b)_{pq}$-$(\omega b)_{rR}$ and minimum $(\omega b)_{pq}^*$-$(\omega b)_{rR}^*$ curve pairs which define $(\omega b)_{max}$ curves for an S-glass/Kevlar polyamide flywheel and an S-glass/graphite flywheel, respectively, at the indicated conditions, parameters, etc., based on the applicable approximate properties from Table I. The approximate values of $(\omega b)_{MAX}$-$\beta_{OPT}$ indicated by the X-Y and X*-Y* pairs of arrows, together with the approximate minimum and maximum $\beta$-values corresponding to at least 0.9 times $(\omega b)_{MAX}$ are tabulated below, for these S-glass core fiber flywheels at $\delta = 0.003$:

| RIM FIBERS | $\beta_{OPT}$ | $(\omega b)_{MAX}$ | $\beta_{MIN}$-$\beta_{MAX}$ | 0.9 × $(\omega b)_{MAX}$ |
|---|---|---|---|---|
| Kevlar | 0.79 | 2975 | 0.64–0.74 | 2677 |
| Graphite | 0.66 | 3725 | 0.77–0.85 | 3352 |

BEST MODE CONTEMPLATED

The best mode contemplated for carrying out the present invention at the time of executing this application has been set forth in the foregoing description (and illustrated in the accompanying drawing), by way of, for example, setting forth preferred materials and ranges and values of parameters material to successful practice of this invention.

In the best mode, the outer circumference of the core and the inner circumference of the rim will each be controlled at a substantially uniform radius and surface finish to provide a circumferentially uniform interface pressure.

It is to be understood that the foregoing detailed description is given merely by way of illustration and that many variations can be made therein without departing from the spirit or scope of this invention.

What is claimed is:

1. In a circumferentially reinforced cross-ply composite flywheel comprising a cross-ply composite central portion comprising a plurality of fiber-containing layers, the fibers of each layer being parallel to each other and extending in radial and chordal directions and being disposed in a matrix of binder material, the fibers of each successive layer being oriented at a single, predetermined angle between approximately 70° and approximately 110° to the fibers of the preceding adjacent layer such that at least four fiber-containing layers are disposed between any two layers in which the fibers of both such layers extend substantially parallel to each other, and means for radially outward transfer of centrifugal loading from the radially outermost chordal fibers of each layer of said central cross-ply composite portion, said load transfer means being an outer rim portion contiguous with said cross-ply composite central portion and of an axial thickness at least as great as that of said central portion, said outer rim portion comprising a multiplicity of circumferentially-extending fibers disposed in a matrix of binder material, the density-to-stiffness ratio of said rim portion being substantially less in value than the density-to-stiffness ratio of said cross-ply composite central portion, the improvement comprising:

(1) $\beta$ is equal to or less than 0.92, where $\beta$ is the ratio of the radius of said cross-ply composite central portion to the outer radius of said rim portion, where both radii are expressed in like units, and (2) said rim and central portions are secured together by an interference fit $\bar{\delta}$ of at least 0.001 inch per inch of said outer radius of said rim portion, where $\bar{\delta}$ is the ratio $\delta/b$ where b is said outer radius and $\delta = u_C + u_R$, where $u_C$ is the circumferentially average radial distance said central portion moves in expansion when said rim portion is removed therefrom with the flywheel at rest and said central portion is at a temperature of 70° F., and $u_R$ is the circumferentially average radial distance which the inner circumference of said rim portion moves in contraction when said central portion is removed therefrom with the flywheel at rest and said rim portion is at said temperature, at least one of $u_C$ and $u_R$ being other than zero, with $\delta$, b, $u_C$ and $u_R$ expressed in like units.

2. The flywheel of claim 1, wherein said $\beta$ is from about 0.6 to about 0.9.

3. The flywheel of claim 1, wherein said interference fit is from 0.001 to about 0.003.

4. The flywheel of claim 1, wherein the modulus of elasticity of the rim-portion fibers radially of the flywheel is substantially less than the modulus of elasticity of the core-portion fibers radially of the flywheel 5. The flywheel of claim 1, wherein the ratio $(E_\theta)_R$ : $(E_\theta)_C$ is at least 3:1, where $(E_\theta)_R$ is the average tangential modulus of elasticity of the rim portion fibers, $(E_\theta)_C$ is the average tangential modulus of elasticity of the central portion fibers, and $(E_\theta)_R$ and $(E_\theta)_C$ are expressed in like units.

6. The flywheel of claim 5, wherein:

said core portion fibers have the following properties: $(E_\theta)_C$ and $(E_r)_C$ of from about $1 \times 10^6$ to about $10 \times 10^6$ psi, $(S_\theta)_C$ of at least $50 \times 10^3$ psi and $(S_r)_C$ of at least $50 \times 10^3$ psi; and said rim portion fibers have the following properties: $(E_\theta)_R$ of from about $6 \times 10^6$ to about $30 \times 10^6$ psi, $(E_r)_R$ of from about $1 \times 10^5$ to about $3 \times 10^7$ psi, $(S_\theta)_R$ of at least $100 \times 10^3$ and $(S_r)_R$ of at least $5 \times 10^2$ psi, where the subscripts C and R refer to the central portion fibers and rim portion fibers, respectively, $E_\theta$ and $E_r$ are the modulus of elasticity in the tangential and radial directions, respectively, and $S_\theta$ and $S_r$ are the breaking strength in the tangential and radial directions, respectively.

7. The flywheel of claim 6, wherein said rim portion fibers are selected from the group consisting of graphite fibers, Kevlar polyamid fibers, and boron fibers, and said central portion fibers are selected from the group consisting of E-glass fibers and S-glass fibers.

8. The flywheel of claim 1, wherein the ratio of $(E_\theta)_R$:$(E_\theta)_C$ and the interference fit are each sufficiently large such that the rim core separation speed $(wb)_{SS}$ is greater than the rim-radial breaking speed $(wb)_{rR}$ for all values of $\beta$ equal to or less than 0.92, where $(\omega b)_{SS}$ is the tangential velocity of the flywheel at the outer radius of the rim at which rim-core separation occurs as determined from a first equation defining $(\omega b)_{SS}$ as a function of terms comprising $\beta$ and $\bar{\delta}$ where $\beta$ and $\bar{\delta}$ are as defined above, said first equation being:

$$(\omega b)_{SS} = \left[ \frac{\bar{\delta}}{\frac{\rho_R A_1}{(Q_r)_R(9-k^2)} - \frac{\rho_C \beta^3 A_2}{8(Q_r)_C}} \right]^{\frac{1}{2}}$$

where:

$$A_1 = \beta^3 + \frac{3 + \alpha_R}{k + \alpha_R}\left(\frac{1-\beta^{k-3}}{1-\beta^{2k}}\right)\beta^k +$$
$$\frac{3 + \alpha_R}{k - \alpha_R}\left(\frac{\beta^{2k} - \beta^{k+3}}{1 - \beta^{2k}}\right)\beta^{-k}$$

$$A_2 = -1 + \frac{3 + \alpha_C}{k + \alpha_C}$$

and $(\omega b)_{rR}$ is the tangential velocity of the flywheel at said outer radius of the rim at which the flywheel fails by rupture of the rim portion fibers in the radial direction of the flywheel, said rupture being transversely of the longitudinal axis of said fibers, as determined from a second equation defining $(\omega b)_{rR}$ as a function of terms comprising $\beta$, $\bar{\delta}$ and $(\sigma r)_R$, said second equation being:

$$(\omega b)_{rR} = \left[\frac{(\sigma_r)_R - (R^{k-1} - R^{-k-1})P\beta^{k+1}}{\left[\frac{\rho_R(3+\alpha_R)}{(9-k^2)(1-\beta^{2k})}\right][(R^{k-1}-R^2)]}\right]^{\frac{1}{2}} \quad \text{(Eq. 2)}$$

where $P_i$ is the rim-core interface contact pressure, which may be determined approximately from Eq. 2a below:

$$P_i = \frac{\bar{\delta}(Q_0)_R}{\beta k \left[\frac{(Q_r)_R/(Q_r)_R}{1-\beta_0^{2k_0}}\right]\left[\frac{1}{k_0 + \alpha_C} + \frac{\beta_0^{2k_0}}{k_0 - \alpha_C}\right] + A_3} \quad \text{(Eq. 2a)}$$

where:

$$A_3 = \left[\frac{1}{\beta(1-\beta^{2k})}\right]\left[\frac{\beta^{2k+1}}{k+\alpha} + \frac{\beta}{k-\alpha}\right]. \quad \text{(Eq. 2b)}$$

and in the above equations:

$\bar{\delta} = \delta/b$, where $\delta$ and b are in like units, b = the outer radius of the rim portion in inches when the flywheel is at rest, $\omega$ = the rotational speed of the flywheel in radians per second, $\delta = \mu_C + \mu_R$ where $\mu_C$ is the radial distance the central portion moves in expansion in inches when the rim is removed therefrom with the flywheel at rest and said portion is at a temperature of 70° F., and $\mu_R$ is the radial distance the rim portion moves in contraction in inches when the central portion is removed therefrom with the flywheel at rest and said rim portion is at said temperature, $(\sigma_r)_R$ = the ultimate tensile strength of the composite rim portion in the radial direction in psi, $\beta$ is a dimensionless number as defined above, $\beta_o = m/a$ where m and a are expressed in like units and are the inner radius and outer radius, respectively, of the central portion (and m can be zero), R = r/b, where r is the radial distance in inches from the geometric axis of the flywheel to any given point therein and b is defined above, $\rho_R$ = the density in pounds per cubic inch of the rim portion, $\rho_C$ = the density in pounds per cubic inch of the central portion, $\alpha_R = (\nu_{r\theta})_R$ where $(\nu_{r\theta})_R$ is Poisson's ratio for the composite rim portion and equals the quotient of the radial tensile strain therein divided by the resulting tangential compressive strain therein, $\alpha_C = (\nu_{r\theta})_C$ where $(\nu_{r\theta})_C$ is Poisson's ratio for the composite central portion and equals the quotient of the radial tensile strain therein divided by the resulting tangential compressive strain therein, $k = [(E_\theta)_R/(E_r)_R]^{\frac{1}{2}}$, where $(E_\theta)_R$ is the average modulus of elasticity of the composite material of the rim portion in the tangential direction and $(E_r)_R$ is the average modulus of elasticity thereof in the radial direction, and each E is in psi, $k_o = [(E_\theta)_C/(E_r)_C]^{\frac{1}{2}}$, where $(E_\theta)_C$ is the average modulus of elasticity of the composite material of the core portion in the tangential direction and $(E_r)_C$ is the average modulus of elasticity thereof in the radial direction, and each E is in psi, $$(Q_r)_R = \left[\frac{(E_r)_R}{1 - (\nu_{r\theta})_R (\nu_{\theta r})_R}\right],$$

where $(E_r)_R$ and $(\nu_{r\theta})_R$ are as defined above and $(\nu_{\theta r})_R$ is Poisson's ratio for the composite material of the rim portion and equals the quotient of the tangential tensile strain therein divided by the resulting radial compressive strain, $$(Q_\theta)_R = \left[\frac{(E_\theta)_R}{1 - (\nu_{r\theta})_R (\nu_{\theta r})_R}\right],$$

where $(\nu_{R\theta})_R$, $(\nu_{\theta r})_R$ and $(E_\theta)_R$ are as defined above, said flywheel being substantially uniform in axial thickness throughout, such that as the rotational speed of said flywheel is increased from $\omega b = 0$, $\omega b$ will reach $(\omega b)_{rR}$ before it reaches $(\omega b)_{SS}$ and said rim portion will be stressed to the breaking strength thereof in the radial direction prior to separation of said rim portion from said central portion.

9. The flywheel of claim 8, wherein (1) $(\omega b)_{RR}$ decreases with decreasing $\beta$ at constant $\delta$, (2) there exists an optimum $\beta$ for each value of $\delta$, said optimum $\beta$ being that value of $\beta$ at which, for a given $\delta$, the rim-radial breaking speed $(\omega b)_{rR}$ is equal to the minimum value of $\omega b$ at such value of $\beta$ and at said given $\delta$ in the group consisting of $(\omega b)_{\theta R}$, $(\omega b)_{rC}$, and $(\omega b)_{\theta C}$, where $(\omega b)_{rC}$ is the tangential velocity of the flywheel at the outer radius of the rim at which the flywheel fails by rupture of the core-portion fibers in the radial direction of the flywheel, $(\omega b)_{\theta C}$ is the tangential velocity of the flywheel at the outer radius of the rim at which the flywheel fails by rupture of the core-portion fibers in the tangential direction of the flywheel, and $(\omega b)_{\theta R}$ is the tangential velocity of the flywheel at the outer radius of the rim at which the flywheel fails by rupture of the rim-portion fibers in the tangential direction of the flywheel, each of said $(\omega b)_{rC}$, $(\omega b)_{\theta C}$, and $(\omega b)_{\theta R}$ increasing with decreasing $\beta$ at same given $\delta$ as $\beta$ decreases to said optimum $\beta$, wherein $(\omega b)_{\theta R}$ is determined from a third equation defining $(\omega b)_{\theta R}$ as a function of terms comprising $\beta$, $\delta$, and $(\sigma_\theta)_R$, said third equation being:

$$(\omega b)_{\theta R} = \left[\frac{(\sigma_\theta)_R - (R^{k-1} - R^{-k-1}) KP\beta^{k+1}}{\left[\frac{\rho_R (3 + \alpha_R)}{(9 - k^2)(1 - \beta^{2k})}\right] [Z]}\right]^{\frac{1}{2}}$$

where:

$$Z = [k(1 - \beta^{k+3})R^{k-1}] + [k(\beta^{2k} - \beta^{k+3})R^{-k-1}] - \left[\frac{k^2 + 3\alpha_R)(1 - \beta^{2k})R^2}{3 + \alpha_R}\right]$$

where $(\sigma_\theta)_R$ is the ultimate tensile strength of the composite rim portion in the tangential direction of the flywheel and the remaining terms are as defined above, wherein $(\omega b)_{rC}$ is determined from a fourth equation defining $(\omega b)_{rC}$ as a function of terms comprising $\beta$, $\delta$, and $(\sigma_r)_C$, said fourth equation being:

$$(\omega b)_{rC} = \left[\frac{(\sigma_r)_C + P}{\frac{\rho_C (3 + \alpha_C)(\beta^2 - R^2)}{8}}\right]^{\frac{1}{2}}$$

where $(\sigma_r)_C$ is the ultimate tensile strength of the composite core portion in the radial direction of the flywheel, $\rho_C$ is the density of said core portion, and the remaining terms are as defined above, wherein $(\omega b)_{\theta C}$ is determined from a fifth equation defining $(\omega b)_{\theta C}$ as a function of terms comprising $\beta$, $\delta$, and $(\sigma_\theta)_C$, said fifth equation being:

$$(\omega b)_{\theta C} = \left[\frac{(\sigma_\theta)_C + P}{\left(\frac{\rho_C (3 + \alpha_C)}{8}\right) (\beta^2 - R^2) \left(\frac{1 - 3\alpha_C}{3 - \alpha_C}\right)}\right]^{\frac{1}{2}}$$

where $(\sigma_\theta)_C$ is the ultimate tensile strength of the composite core in the tangential direction of the flywheel and the remaining terms are as defined above, (3) each optimum $\beta$ having associated therewith a maximum rotational speed $\omega$-max of the flywheel at which the rim-radial breaking speed is equal to said minimum value, and for a given $\delta$, the $\beta$ ratio of the flywheel is in the range of values of $\beta$ throughout which the flywheel can be rotated at a speed of at least 0.9 times $\omega$-max without exceeding any of the breaking strengths in the group consisting of $(\sigma_\theta)_C$, $(\sigma_\theta)_R$, $(\sigma_r)_C$ and $(\sigma_r)_R$, said range including such optimum $\beta$.

10. The flywheel of claim 9, wherein said interference fit is at least 0.75 times $\delta$-max, where $\delta$-max is that value of $\delta$ at which the pressure at the rim-core interface is the lesser of $P_I$ and $P_{II}$ where $P_I$ and $P_{II}$ are the static rupture pressures of the core and rim, respectively.

11. The flywheel of claim 9, wherein said range of $\beta$ is from about 0.6 to 0.9.

12. The flywheel of claim 11, wherein the core portion fibers are principally E-glass fibers and the rim-portion fibers are principally Kevlar polyamide fibers, and $\bar{\delta}$ is from about 0.002 to about 0.004.

13. The flywheel of claim 11, wherein the core portion fibers are principally S-glass fibers and the rim-portion fibers are principally Kevlar polyamide fibers, and $\delta$ is from about 0.002 to about 0.004.

14. The flywheel of claim 11, wherein the core-portion fibers are principally S-glass fibers and the rim-portion fibers are principally graphite fibers, and $\delta$ is from about 0.002 to about 0.004.

* * * * *